United States Patent [19]

Herchenbach et al.

[11] Patent Number: 4,468,206

[45] Date of Patent: Aug. 28, 1984

[54] TORQUE-LIMITING CLUTCH

[75] Inventors: Paul Herchenbach, Ruppichteroth; Mathias Konrad, Troisdorf, both of Fed. Rep. of Germany

[73] Assignee: Jean Walterscheid GmbH

[21] Appl. No.: 463,268

[22] Filed: Feb. 2, 1983

[30] Foreign Application Priority Data

Feb. 16, 1982 [DE] Fed. Rep. of Germany ....... 3205513

[51] Int. Cl.³ .............................. F16D 7/00
[52] U.S. Cl. .................... 464/37; 192/56 R
[58] Field of Search .................. 464/37–39, 464/30; 192/56 R

[56] References Cited

U.S. PATENT DOCUMENTS

| 2,514,228 | 7/1950 | Dodge ........................ 464/37 X |
| 2,909,047 | 10/1959 | Walterscheid-Muller et al. ... 464/37 X |
| 2,948,373 | 8/1960 | Schild ........................ 464/37 X |
| 4,261,453 | 4/1981 | Kunze ........................ 464/37 X |

FOREIGN PATENT DOCUMENTS 912411 5/1954 Fed. Rep. of Germany.
2148352 4/1972 Fed. Rep. of Germany.
2827948 1/1980 Fed. Rep. of Germany.

Primary Examiner—John Petrakes
Attorney, Agent, or Firm—Toren, McGeady and Stanger

[57] ABSTRACT

Clutch engagement members radially movable to bring a clutch sleeve and a clutch hub into and out of driving engagement are displaced by radially movable spring loaded cam members having inner contact faces which engage cam surfaces on the radially inner ends of the engagement members, the cam surfaces on the engagement members being formed to include a first cam surface extending obliquely relative to the direction of movement of the cam members at a different angle than a second cam surface.

17 Claims, 4 Drawing Figures

TORQUE-LIMITING CLUTCH

The present invention relates generally to torque-limiting clutches and more particularly to a clutch wherein radially movable engagement members are driven by spring loaded cam members to effect driving engagement between a clutch hub and a clutch sleeve.

The invention is of the type which generally relates to torque-limiting clutches particularly useful for the protection of drive lines in machinery such as agricultural equipment or implements wherein power is derived from the power takeoff shaft of a tractor.

Clutches of the type to which the present invention relates generally consist of a clutch hub with a clutch sleeve supported on the hub and being brought into torque-transmitting engagement therewith by driving members which are guided in radial apertures in the clutch hub and which are arranged in pairs having trapezoidal cams provided on their radial exterior which engage into axially extending recesses of the clutch sleeve. The radially interior ends of the engagement members are supported on trapezoidal heads of supporting cams spring loaded radially inwardly and arranged in pairs.

U.S. Pat. No. 4,261,453 discloses a prior art torque-limiting clutch of the type herein referred to. In the torque-limiting clutch of this prior art device, there are provided radially guided engagement members which, by means of tapered faces, are supported on other tapered faces arranged on a switching ring which is loaded axially by a spring. In the case of overload, the driving or engaging members of this clutch skip over the tapered faces which are formed as cams and which are arranged on the switching ring in a segment-like manner and after the changeover of the clutch into the freewheeling position, they are held by the cams in the freewheeling position. In order to enable re-engagement of the clutch, it is necessary to stop the drive transmission of the clutch and to return clutch into the engaged position by turning the switching ring with the cams away from the area of movement of the engaging members.

By means of radially acting springs arranged in the engagement members, these members are returned into the driving position. The switching ring is returned into the torque holding position by a circumferentially acting spring.

The disadvantage of devices of the type previously described is that in order to re-engage the torque-limiting clutch, the driving operation must be stopped and the re-engagement operation must be carried out manually. This is particularly disadvantageous in the case of overload clutches which are used to protect drive lines between a tractor and an agricultural implement. In such devices, when clutch re-engagement must be established, the driver is forced to leave the driver's seat in order to re-engage the clutch. In cases where the torque-limiting clutch reacts with great frequency, for example when the agricultural implement is working on stony ground, the necessity for constantly manually re-engaging the clutch places a heavy burden on the driver.

Therefore, the present invention is directed toward provision of a torque-limiting clutch which will automatically re-engage after disengagement and which will ensure that the torque is distributed evenly on the driving members which are arranged in pairs and that during assembly and dismantling of the clutch, the driving members will not be subjected to undue forces.

SUMMARY OF THE INVENTION

Briefly, the present invention may be described as a torque-limiting clutch comprising: a clutch sleeve having clutch engaging means; a clutch hub adapted to be placed in torque-transmitting engagement with said clutch sleeve; a plurality of clutch engagement members mounted in said clutch hub and radially movable between a clutch-engaged position and a clutch-disengaged position to bring said clutch hub and said clutch sleeve into and out of torque-transmitting engagement; said clutch engagement members each having radially innermost and radially outermost ends, with said outermost ends being formed with complementary clutch engaging means adapted to engage said clutch engaging means on said clutch sleeve when said engagement members are in said clutch-engaged position; a plurality of cam members mounted in said clutch hub engaging said innermost ends of said clutch engagement members and radially movable to drive said clutch engagement members into said clutch-engaged position; spring means biasing said cam members in a direction to drive said engagement members toward said clutch-engaged position, said cam members being movable against the biasing force of said spring means to enable said engagement members to move to said clutch-disengaged position; and cam surface means formed on said innermost ends of said engagement members at which said cam members abut, said cam surface means comprising first cam surface means arranged to be in abutment with said cam members when said engagement members are in said clutch-engaged position and second cam surface means arranged to be in abutment with said cam members when said engagement members are in said clutch-disengaged position; said first and said second cam surface means extending obliquely relative to the radial direction of movement of said cam members, said second cam surface means extending relative to said radial direction of movement at a steeper angle than said first cam surface means.

The first and second cam surface means on the engagement members may be formed in the radial section as two trapezoids arranged one above the other. The opening angle of the trapezoid provided on the outside of the driving member may be arranged to be greater than the opening angle of the trapezoid arranged inside, and the spring means may be arranged to bias the cam members in a direction radially inwardly of the clutch and they may be arranged on a pin passing through the supporting cam members. In a torque-transmitting or clutch-engaged position, the cam members will mutually support each other by operation of stop members projecting from the radially inner ends of the cam members, which inner ends may be formed in the shape of trapezoidal heads. In the clutch-engaged position, the trapezoidal heads of the cam members will correspond to the outer trapezoids of the engagement members, and in the overload condition when the engagement members are in the clutch-disengaged position, the end faces of the trapezoidal ends of the cam members will be supported on the lateral faces of the inner trapezoids of the projections of the engagement members forming the second cam surface means.

When the clutch is in the engaged or torque-transmitting condition, the cam members by means of their trapezoidal heads will be held so as to be aligned relative to the outer trapezoids forming the first cam surface means.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
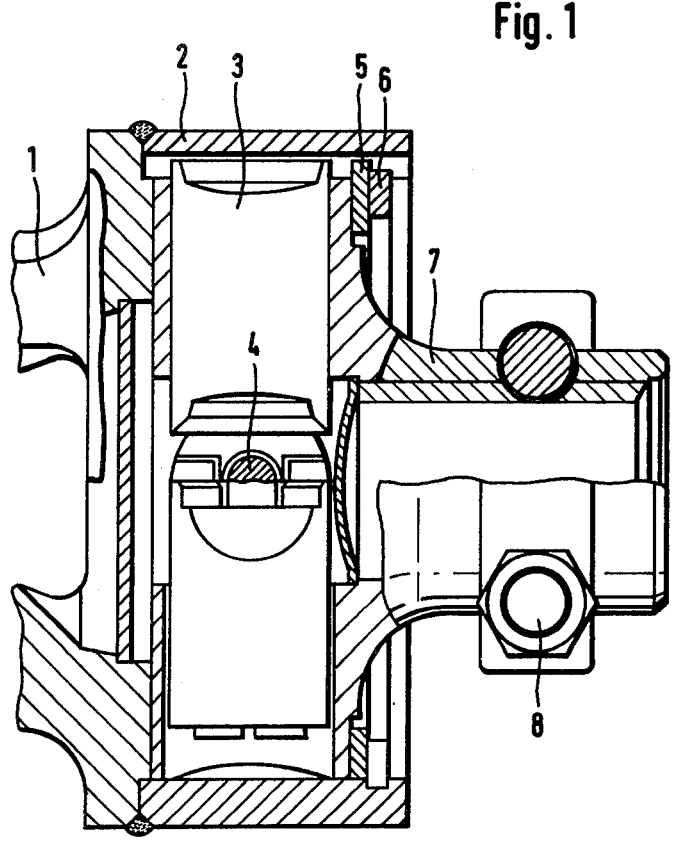
FIG. 1 is a longitudinal sectional view taken along the line A-B of FIG. 2 showing a torque-limiting clutch in accordance with the invention.

The clutch assembly in accordance with the invention shown in the drawings, wherein similar reference numerals are utilized to identify like parts throughout the various figures thereof, is essentially comprised of a slip-on clutch hub 7 and a clutch sleeve 2 which are adapted to be placed in torque-transmitting engagement by the clutch device of the invention. The slip-on hub 7 is arranged so as to be fixed by bolts 8 onto a shaft (not shown) which may for example be the power takeoff shaft of a tractor.

The clutch hub 7 is located within the clutch sleeve 2 and is axially held relative thereto by means of a supporting ring 5 and an axial securing device 6.

As illustrated in FIG. 1, the clutch sleeve 2 is provided with a joint yoke 1 for connection to a drive shaft (not shown).

Figure 2:
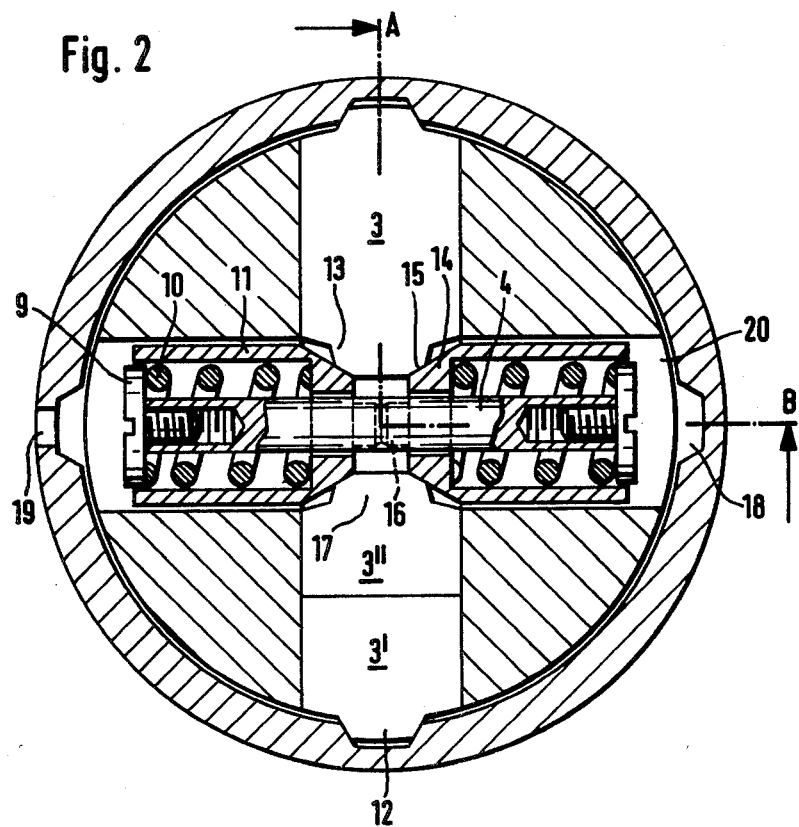
FIG. 2 is a cross-sectional view of a clutch in accordance with the invention shown in the engaged position.

The elements of the invention are shown in greater detail in FIG. 2, where the clutch in accordance with the invention is shown in the clutch-engaged position. The clutch assembly includes a plurality of engagement or driving members 3 having engagement means in the form of trapezoidal teeth 12 arranged on the radially outer sides of the engagement members 3. The trapezoidal teeth 12 are adapted to engage in complementary engagement means formed on the inner surface of the clutch sleeve 2 in the form of engagement recesses 18.

The engagement members 3 also include a radially innermost end having a projection 17 formed thereat. The projections 17 include cam surface means in the form of first cam surface means 15 and second cam surface means 13 adapted to engage cam members 11, in a manner to be more fully described hereinafter. The cam surface means 13 and 15 on the projections 17 may be in the form of two trapezoids 13 and 15 arranged one above the other. The opening angle of the trapezoid 15 arranged on the outside of the engagement member 3 is greater than the opening angle of the trapezoid 13 arranged on the inside. In the torque-transmitting position, the engagement members 3, by means of the tapered faces of the outer trapezoid 15, are supported on heads 14 of the cam members 11 and the tapered faces associated therewith. A pin 4 passes through the cam members 11 and springs 10 are arranged inside the cam members 11, by means of their ends pointing outwardly, supporting themselves on adjusting screws 9 associated with the pin 4.

The cam members 11 are formed with the tapered heads 14 which engage the projections 17 of the engagement members 3. The pin 4 extends from one cam member 11 shown to the left in FIG. 2 to the other cam member 11 shown to the right in FIG. 2. The springs 10 are interposed in spring engagement between the cam members 11 and the pin 4 as a result of their engagement with the adjusting screws 9 which are adjustably fixed on the pin 4.

With the clutch in the engaged or torque-transmitting position, the cam members 11 support each other by means of stops 16 arranged on each of the cam members 11 at their radially innermost sides at the heads 14. This arrangement will ensure that if the torque-limiting clutch is not loaded and if it must be dismantled, the engagement members 3 and the cam members 11 may be removed and reinserted in a force-free manner.

The cam members 11 are centered exclusively by means of the heads 14. The hub 7 is formed with apertures 20 within which the cam members 11 are supported. However, the apertures 20 within which the cam members 11 are received are overdimensioned relative to the cam members 11 to such an extent that they cannot have an aligning function.

The lower half of FIG. 2 shows a driving member 3 which is designed in two parts, 3' and 3''. The trapezoidal teeth 12 and the projections 17 are aligned automatically relative to the respective counterfaces.

Figure 3:
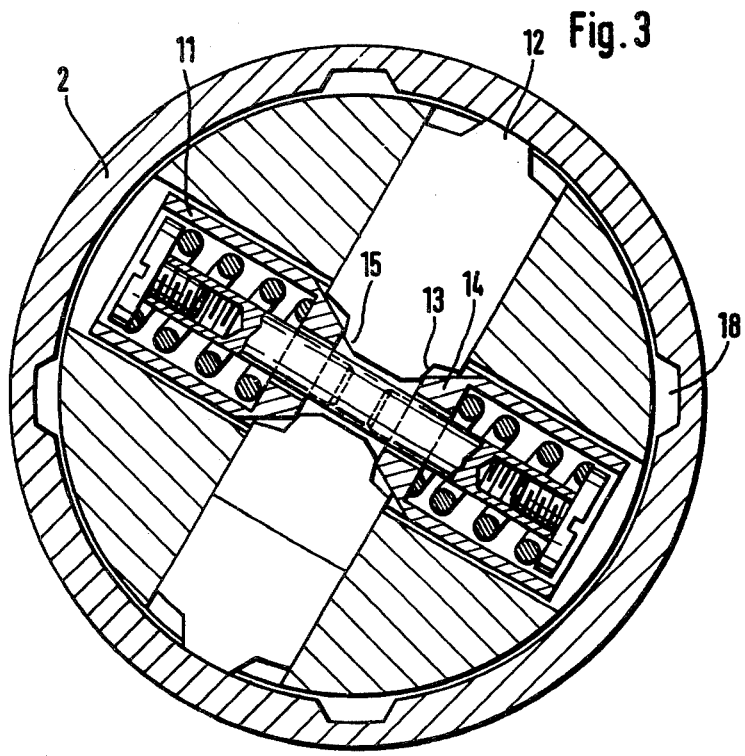
FIG. 3 is a cross-sectional view of a clutch shown in the disengaged or overload position.

In FIG. 3, the torque-limiting clutch of the present invention is shown in the freewheeling position which is established following an overload of the clutch. The teeth 12 of the engagement members 3 are disengaged from the recesses 18 of the clutch sleeve 2 and the engagement members 3 have moved radially inwardly. At the same time, the cam members 11 have moved radially outwardly. The projections 17 ensure that the cam members 11 are moved radially outwardly with a planar face associated with the heads 14 coming to rest against the inner trapezoid 13 of the projection 17 of the engagement member 3. The residual moment permitting the clutch to be re-engaged into the torque-transmitting position is obtained as a result of the cooperation between the planar face of the head 14 at the cam member 11 and the lateral faces of the inner trapezoid 15 of the projection 17. The residual moment permitting re-engagement of the clutch may be adapted to existing requirements by changing the tapered faces of the inner trapezoid 13.

In order to be able to change the transferable torque of the clutch in the assembled condition, the clutch sleeve 2 is provided with an aperture 19 through which an adjusting tool may be inserted in order to enable the adjusting screws 9 to be reset thereby changing the spring force of the springs 10.

Figure 4:
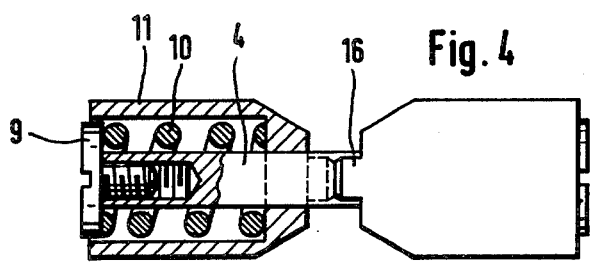
FIG. 4 is a view partially in section showing the cam members of the assembly of the invention.

FIG. 4 shows the complete assembly of the cam members 11 which support each other by means of the stops 16 and which, after the spring biasing force of the spring members 10 has been externally set, may be inserted into the torque-limiting clutch in the preassembled condition indicated in FIG. 4.

It will be noted from FIG. 2 that when the clutch is in the engaged condition, the surfaces of the heads 14 of the cam members 11 will be in engagement with the first cam surface means 15. When the clutch shifts into the disengaged position, the cam members 11 are moved radially outwardly against the biasing force of the springs 10 and the condition depicted in FIG. 3 will exist. With the clutch in the disengaged condition, the heads 14 of the cam members 11 will be engaged against the second surface means 13 inasmuch as the engagement members 3 will have moved radially inwardly as a result of the radially outward movement of the cam members 11.

From the drawings it will be seen that the first and second cam surface means 13, 15 extend obliquely relative to the radial direction of movement of the cam members 11 and that the second cam surface means 13 extends relative to said direction of movement at a steeper angle than the first surface means 15. The angle of the second surface means 13 affects the re-engagement force or moment which exists when the clutch is to be re-engaged by movement of the cam members 11 radially inwardly under the force of the springs 10. It will of course be seen that the cam members 11 will move automatically to the radially innermost or clutch-engaged position whereupon the heads 14 will move from engagement with the second cam surface means 13 into engagement with the first cam surface means 15 thereby driving the engagement members 3 radially outwardly so that the trapezoidal teeth 12 may once again re-engage into the recesses 18 whereby the clutch is shifted to the clutch-engaged condition depicted in FIG. 2.

As will be apparent from the disclosure, the present invention, as compared with previous designs, will provide the advantage of ensuring that the re-engagement of the clutch will be achieved simply by a reduction in the speed of the clutch.

Additionally, as a result of the self-centering effect which is achieved, the clutch may be assembled or dismantled in a force-free manner. This is particularly advantageous if a torque-limiting clutch used in the drive mechanism of any agricultural machinery must be removed, repaired, or cleaned in the course of field application. Particularly, any risks of accident due to the clutch being handled by inexperienced operators will be eliminated.

There is the further advantage that the transferable moment of the torque-limiting clutch may be adjusted through the aperture 19 provided in the clutch sleeve without there being any need for total dismantling of the clutch.

The self-centering design of the clutch ensures that the torque to be transferred will be evenly distributed to the engagement members 3 which may be arranged in pairs.

A further important advantage of the invention consists in the fact that the disengagement moment is determined by the cooperation between the supporting faces of the engagement members 3 and the cam members 11 and the resulting transmission ratio, and not by the interaction between the trapezoidal teeth 12 engaging into the recesses 18 of the clutch sleeve. Since the trapezoidal teeth of the engagement members 3 are subject to wear in cases of overload and in cases where the clutch sleeve rotates relative to the clutch hub, such wear will affect the geometric shape of the teeth and the mechanism in accordance with the present invention will ensure that once the disengaged position or moment is set, it may be retained for a long period of time.

Furthermore, as a result of the self-centering effect of the torque-limiting clutch, all components participating in the control of the clutch may be produced with relatively large tolerances without producing any adverse influence or effects on the clutch itself.

Inasmuch as the cam members support against each other by means of the stops 16 projecting from the end faces of the trapezoidal heads 14 when the clutch is in the torque-transmitting position, it is possible prior to assembly of the clutch to set the spring force to a determined switching moment by means of simple devices.

It will be noted that, in accordance with one aspect of the invention, at least one of the springs 10 loading the cam members is supported against the adjusting screw 9 which is a stop member adjustable at least in the direction of torque reduction.

As the springs are arranged on a pin which passes through both the cam members and the spring forces offset each other, it is sufficient to have the minimum requirement of designing the spring force so as to be adjustable at one end of the pin 4. In many cases, it is advantageous to limit the adjustability of the clutch to the direction of torque reduction to prevent the operator from setting the switching moment of the torque-limiting clutch at too high a value which would damage the implements or machinery concerned.

In accordance with a further feature of the invention, the trapezoidal teeth 12 of the engagement members 3 and the corresponding recesses 18 are designed as oblique-angled trapezoids. Whereas the standard design of the torque-limiting clutch acts with the same disengagement force or switching-off moment in both directions of rotation, this measure permits different disengagement forces to be predetermined for both directions of rotation. In extreme cases, the torque-limiting clutch may be designed without any disengagement effect occurring in the nonpreferred direction of rotation, i.e., the introduced torque is driven through completely. This effect is desirable for example if an attached loading implement must be released by a reversal of rotation.

It is a further advantage of the invention that the engagement members 3 taken in their axial direction are designed so that they may be divided into two parts.

This measure eliminates in a simple manner any possible alignment defects between the trapezoidal teeth 12 engaging into the recesses 18 and the projections 17 engaging on the cam members 11.

As indicated in the foregoing, in accordance with a further feature of the invention, additional spring means may be arranged between the two parts 3' and 3" of the divided engagement members 3, and as a result it is possible to increase the residual moment or force which causes re-engagement of the clutch following a case of overloading.

In a further aspect of the invention, the inside of the clutch sleeve has been provided with a number of recesses 18 which correspond to an integral multiple of the number of engagement members 3 which are provided. As will be noted in FIG. 2, in the embodiment depicted, two engagement members 3 are provided and four recesses 18 are shown.

On the one hand, this measure will increase the engaging frequency of the clutch and, on the other hand, any wear which might occur will be distributed among a multiplicity of recesses in the clutch sleeve.

It is also advantageous with regard to the present invention that the clutch be formed with a multi-row design in order to increase the transferrable torque. This arrangement will permit an increase in the torque transferred by the torque-limiting clutch without increasing the outer diameter limiting the free space between a tractor and an agricultural implement.

While a specific embodiment of the invention has been shown and described in detail to illustrate the application of the inventive principles, it will be understood that the invention may be embodied otherwise without departing from such principles.

What is claimed is:

1. A torque-limiting clutch comprising:
    a clutch sleeve having clutch engaging means;
    a clutch hub adapted to be placed in torque-transmitting engagement with said clutch sleeve;
    a plurality of clutch engagement members mounted in said clutch hub and radially movable between a clutch-engaged position and a clutch-disengaged position to bring said clutch hub and said clutch sleeve into and out of torque-transmitting engagement;
    said clutch engagement members each having radially innermost and radially outermost ends, with said outermost ends being formed with complementary clutch engaging means adapted to engage said clutch engaging means when said engagement members are in said clutch-engaged position;
    a plurality of cam members mounted in said clutch hub engaging said innermost ends of said clutch engagement members and radially movable to drive said clutch engagement members into said clutch-engaged position;
    spring means biasing said cam members in a direction to drive said engagement members toward said clutch-engaged position, said cam members being movable against the biasing force of said spring means to enable said engagement members to move to said clutch-disengaged position; and
    cam surface means formed on said innermost ends of said engagement members at which said cam members abut, said cam surface means comprising first cam surface means arranged to be in abutment with said cam members which said engagement members are in said clutch-engaged position and second cam surface means arranged to be in abutment with said cam members when said engagement members are in said clutch-disengaged position;
    said first and said second cam surface means extending obliquely relative to the radial direction of movement of said cam members, said second cam surface means extending relative to said radial direction of movement at a steeper angle than said first cam surface means.

2. A clutch according to claim 1 wherein said spring means are adjustable to enable adjustment of said biasing force.

3. A clutch according to claim 1 wherein said complementary clutch engaging means comprise trapezoidal teeth and wherein said clutch engaging means comprise corresponding recesses, said trapezoidal teeth and said corresponding recesses being designed as oblique-angled trapezoids.

4. A clutch according to claim 1 wherein said clutch engagement members are formed in two parts.

5. A clutch according to claim 1 further comprising additional spring means applying a spring biasing force tending to drive said engagement members radially outwardly.

6. A clutch according to claim 1 wherein said clutch engaging means comprise a plurality of recesses formed on said clutch sleeve, the number of said recesses corresponding to an integral multiple of the number of said plurality of clutch engagement members which are provided.

7. A clutch according to claim 1 wherein said clutch is formed with a multiple-row design in order to increase the transferable torque thereof.

8. A clutch according to claim 1 wherein said cam surface means comprise a projection formed on said innermost ends of said engagement members represented in the radial section by two trapezoids arranged one above the other, said trapezoids forming said first and said second cam surface means.

9. A clutch according to claim 8 wherein one of said trapezoids is provided on the outside of said engagement members and the other of said trapezoids is arranged on the inside and wherein said trapezoid provided on the outside of said engagement member has an opening angle which is greater than the opening angle of the trapezoid arranged on the inside.

10. A clutch according to claim 9 wherein said cam members comprise trapezoidal heads arranged to engage with said cam surface means, said trapezoidal heads corresponding to said outer trapezoids of said engagement members.

11. A clutch according to claim 10 wherein when said clutch is in the overload or clutch-disengaged position, said cam members at their trapezoidal heads are supported upon lateral faces of said inner trapezoids of said projections of the engagement members.

12. A clutch according to claim 11 wherein in the torque-transmitting position of said clutch said cam members by means of their trapezoidal heads are held so as to be aligned relative to the outer trapezoids of said engagement members.

13. A clutch according to claim 1 wherein said cam members are formed in diametrically opposed pairs and include a pin extending between said diametrically opposed pairs, said spring means comprising a pair of springs each arranged, respectively, in engagement between one of said cam members and said pin.

14. A clutch according to claim 13 wherein said pair of cam members are arranged to support against each other on the radially innermost sides thereof by means of stop members projecting from said radially innermost sides, said radially innermost sides of said cam members being formed with trapezoidal heads adapted to engage with said cam surface means.

15. A clutch according to claim 1 wherein said cam members and said engagement members are arranged in diametrically opposed pairs, with said cam members being formed with beveled radially innermost ends defining a tapered circumferential surface and an end face extending perpendicularly to said radial direction of movement of said cam members, said tapered circumferential surface being in engagement with said second cam surface means when said engagement members are in their clutch-engaged position and said end face being in engagement with said first cam surface means when said engagement members are in said clutch-disengaged position.

16. A clutch according to claim 1 wherein the angle of inclination of said second cam surface means relative to the direction of movement of said cam members is selected in accordance with the force at which said clutch switches from the clutch-disengaged position to the clutch-engaged position.

17. A clutch according to claim 1 wherein said spring means are adjustable to adjust the operating condition at which said clutch switches between the clutch-engaged position and the clutch-disengaged position.

* * * * *